(12) United States Patent
Childress

(10) Patent No.: US 11,035,591 B2
(45) Date of Patent: Jun. 15, 2021

(54) BEARING ASSEMBLY FOR SOLAR TRACKERS

(71) Applicant: COROSOLAR LLC, Phoenix, AZ (US)

(72) Inventor: Isaac Riley Joseph Childress, San Rafael, CA (US)

(73) Assignee: CoroSolar LLC, Phoenix, AZ (US)

( * ) Notice: Subject to any disclaimer, the term of this patent is extended or adjusted under 35 U.S.C. 154(b) by 214 days.

(21) Appl. No.: 15/293,146

(22) Filed: Oct. 13, 2016

(65) Prior Publication Data

US 2017/0102168 A1 Apr. 13, 2017

Related U.S. Application Data

(60) Provisional application No. 62/240,661, filed on Oct. 13, 2015.

(51) Int. Cl.
| | | |
|---|---|---|
| *F24S 30/425* | (2018.01) | |
| *F16C 17/10* | (2006.01) | |
| *F16C 13/04* | (2006.01) | |
| *F24S 25/65* | (2018.01) | |
| *F24S 30/00* | (2018.01) | |
| *F24S 25/10* | (2018.01) | |

(52) U.S. Cl.
CPC ............ *F24S 30/425* (2018.05); *F16C 13/04* (2013.01); *F16C 17/10* (2013.01); *F24S 25/65* (2018.05); *F16C 2300/30* (2013.01); *F24S 25/10* (2018.05); *F24S 2030/10* (2018.05); *F24S 2030/14* (2018.05); *F24S 2030/15* (2018.05); *Y02E 10/47* (2013.01)

(58) Field of Classification Search
CPC ...... F16C 13/04; F16C 17/10; F16C 2300/30; F24S 25/65; F24S 30/425; F24S 2030/10; F24S 2030/14; F24S 2030/15; F24S 25/10; Y02E 10/47
See application file for complete search history.

(56) References Cited

U.S. PATENT DOCUMENTS

| 27,521 | A | * | 3/1860 | Carman | ................. | A47C 7/402 |
| | | | | | | 297/376 |
| 73,183 | A | * | 1/1868 | Henfield | ................. | F16C 33/08 |
| | | | | | | 384/296 |
| 153,478 | A | * | 7/1874 | Cutter | .................... | A47C 1/026 |
| | | | | | | 297/328 |

(Continued)

FOREIGN PATENT DOCUMENTS

WO WO2016/071608 A1 5/2016

OTHER PUBLICATIONS

SunLink ViaSol Tracker. Brochure.

(Continued)

*Primary Examiner* — Avinash A Savani
*Assistant Examiner* — Martha M Becton
(74) *Attorney, Agent, or Firm* — Snell & Wilmer L.L.P.

(57) ABSTRACT

A solar tracker bearing assembly has a rotating element sandwiched between two mounting brackets and held together by fasteners. The rotating element includes an arc-shaped slot such that the rotating element can pivot against the fixed mounting brackets. Bearings may be positioned within the arc-shaped slot. The rotating element can be configured to accept toque tubes of various cross-sections.

19 Claims, 15 Drawing Sheets

(56) References Cited

U.S. PATENT DOCUMENTS

| | | | | |
|---|---|---|---|---|
| 1,292,235 | A * | 1/1919 | Beckett | B23Q 1/5437 269/61 |
| 1,737,382 | A * | 11/1929 | Morehouse | A44B 9/18 24/708 |
| 1,963,897 | A * | 6/1934 | Greville | A61G 13/0036 602/39 |
| 2,040,718 | A * | 5/1936 | Tautz | B23D 55/026 83/648 |
| 2,115,579 | A * | 4/1938 | Hannaford | B41F 31/304 101/335 |
| 2,163,320 | A * | 6/1939 | Hammond | B27G 19/02 83/102.1 |
| 2,366,266 | A * | 1/1945 | Kallenbach | B06B 3/00 74/25 |
| 2,445,016 | A * | 7/1948 | Bentley | B23K 37/0461 269/59 |
| 2,471,014 | A * | 5/1949 | Trebert, Jr. | B23Q 1/5437 269/309 |
| 2,477,463 | A * | 7/1949 | Otterman | A61F 2/582 623/60 |
| 2,479,623 | A * | 8/1949 | Johnson | B66F 9/127 414/607 |
| 2,545,953 | A * | 3/1951 | Hall | B66F 7/14 269/32 |
| 2,737,707 | A * | 3/1956 | Highet | B21D 5/143 29/898.056 |
| 2,850,054 | A * | 9/1958 | Eschenburg | B27B 5/243 83/473 |
| 3,106,111 | A * | 10/1963 | Denisco | B23B 39/14 269/71 |
| 3,220,720 | A * | 11/1965 | Hatschek | G01N 1/28 269/61 |
| 3,273,879 | A * | 9/1966 | Floren | B23Q 1/5443 269/61 |
| 3,342,527 | A * | 9/1967 | Bencene | B60N 2/22 297/378.12 |
| 3,362,295 | A * | 1/1968 | Galbarini | B23Q 3/18 409/198 |
| 3,375,563 | A * | 4/1968 | Weinkamer | F16C 17/10 29/898.058 |
| 3,608,761 | A * | 9/1971 | Taylor | B66F 9/08 414/633 |
| 3,613,659 | A * | 10/1971 | Phillips | G01S 3/7861 126/605 |
| 3,657,963 | A * | 4/1972 | Miller | B23Q 1/5437 409/168 |
| 3,690,641 | A * | 9/1972 | Claycomb | B23Q 3/108 269/20 |
| 3,700,228 | A * | 10/1972 | Peale | B23Q 1/5437 269/61 |
| 3,814,414 | A * | 6/1974 | Chapa | A61B 6/04 5/601 |
| 3,820,860 | A * | 6/1974 | Stone | F16C 35/02 198/672 |
| 3,827,682 | A * | 8/1974 | Foster, Sr. | B23K 37/0452 269/8 |
| 3,929,395 | A * | 12/1975 | Stojek | F16C 9/02 384/432 |
| 3,935,987 | A * | 2/1976 | Foster, Sr. | B23K 37/0452 228/213 |
| 3,972,576 | A * | 8/1976 | Hill | F16C 17/10 384/276 |
| 3,999,799 | A * | 12/1976 | Daswick | A47C 3/0257 297/270.3 |
| 4,100,915 | A * | 7/1978 | Carlson | G01S 3/7861 126/605 |
| 4,135,493 | A * | 1/1979 | Kennedy | G01S 3/7861 126/577 |
| 4,205,657 | A * | 6/1980 | Kelly | F24S 23/74 126/603 |
| 4,462,579 | A * | 7/1984 | Satake | B23Q 1/28 108/20 |
| 4,603,982 | A * | 8/1986 | Dittrich | F16C 33/20 384/129 |
| 4,637,322 | A * | 1/1987 | Hampshire | A47B 9/16 108/102 |
| 4,655,471 | A * | 4/1987 | Peek | A61G 5/1067 280/250.1 |
| 4,704,038 | A * | 11/1987 | Bruchon, Jr. | F16C 33/08 384/443 |
| RE32,764 | E * | 10/1988 | Smith | F16C 17/10 384/275 |
| 4,778,332 | A * | 10/1988 | Byers | H01L 21/6838 414/735 |
| 4,815,585 | A * | 3/1989 | May | B65G 33/32 198/672 |
| 4,949,944 | A * | 8/1990 | Groff, Sr. | B25B 5/003 269/296 |
| 5,156,508 | A * | 10/1992 | Grisley | B25B 5/08 269/236 |
| 5,181,762 | A * | 1/1993 | Beumer | A61G 5/006 297/330 |
| 5,228,924 | A * | 7/1993 | Barker | F24J 2/541 136/246 |
| 5,505,546 | A * | 4/1996 | Okude | F16C 33/20 384/276 |
| 5,520,465 | A * | 5/1996 | Kammel | B60G 21/0551 267/293 |
| 5,634,748 | A * | 6/1997 | Brazell | B23B 39/00 408/103 |
| 6,058,930 | A | 5/2000 | Shingleton | |
| 6,106,065 | A * | 8/2000 | Carroll | A47C 1/0347 297/325 |
| 6,375,178 | B1 * | 4/2002 | Schilb | B23Q 1/66 269/71 |
| 6,382,725 | B1 * | 5/2002 | Carroll | A47C 1/0347 297/325 |
| 6,568,008 | B2 * | 5/2003 | Siepmann | A61G 13/0018 5/617 |
| 7,007,965 | B2 * | 3/2006 | Bernatsky | A61G 5/12 280/304.1 |
| 7,090,240 | B2 * | 8/2006 | Papac | A61G 5/12 280/250.1 |
| 7,354,199 | B2 * | 4/2008 | Welch | F16C 9/00 384/275 |
| 7,465,099 | B2 * | 12/2008 | Connell | A01B 63/16 384/275 |
| 7,531,741 | B1 * | 5/2009 | Melton | H02S 20/32 136/246 |
| 7,610,638 | B2 * | 11/2009 | Kramer | A61G 7/015 5/618 |
| 7,708,344 | B1 * | 5/2010 | Broering | A61G 15/02 297/330 |
| 7,857,269 | B2 * | 12/2010 | Plaisted | F16L 3/127 248/237 |
| 7,989,746 | B2 * | 8/2011 | Chen | H02S 20/00 250/203.4 |
| 8,061,755 | B2 * | 11/2011 | Brendel | A61G 5/045 296/65.15 |
| 8,104,835 | B2 * | 1/2012 | Ovre | A61G 5/127 297/340 |
| 8,226,278 | B2 * | 7/2012 | Ward | F21S 8/02 362/365 |
| 8,353,855 | B2 * | 1/2013 | Ingrao | A61H 1/003 601/89 |
| 8,419,130 | B2 * | 4/2013 | Bergman | A61G 5/042 180/907 |
| 8,763,601 | B2 * | 7/2014 | Doyle | F24J 2/10 126/604 |
| 8,807,839 | B2 * | 8/2014 | Jang | F24S 25/60 384/432 |
| 8,936,315 | B2 * | 1/2015 | Fienup | A61B 3/024 297/330 |
| 8,939,143 | B2 * | 1/2015 | Zuritis | H02S 20/10 126/569 |
| 8,939,648 | B2 * | 1/2015 | Schneider | F16C 17/02 384/428 |

(56) References Cited

U.S. PATENT DOCUMENTS

| | | | |
|---|---|---|---|
| 9,010,787 B2* | 4/2015 | Slagerman | A61G 5/1075 280/250.1 |
| 9,035,168 B2* | 5/2015 | Barton | H02S 20/32 136/246 |
| 9,117,951 B2* | 8/2015 | Park | H02S 20/30 |
| 9,157,658 B2* | 10/2015 | Kunz | F24S 30/425 |
| D743,881 S* | 11/2015 | Au | D13/102 |
| 9,182,030 B2* | 11/2015 | Morgan | F16H 57/02 |
| 9,206,999 B2* | 12/2015 | Reed | H02S 20/32 |
| 9,236,514 B1* | 1/2016 | Tarico | H01L 31/052 |
| 9,303,684 B2* | 4/2016 | Clavijo Lumbreras | F16C 11/0695 |
| 9,322,437 B2* | 4/2016 | Agullo | F16C 35/02 |
| 9,466,749 B1* | 10/2016 | Au | H02S 20/32 |
| 9,554,955 B2* | 1/2017 | Blauch | A61G 5/1075 |
| 9,640,695 B2* | 5/2017 | Fischer | H01L 31/052 |
| 9,806,669 B2 | 10/2017 | Michotte De Welle | |
| 9,819,301 B2* | 11/2017 | Ripoll Agullo | H02S 20/00 |
| 9,970,686 B2 | 5/2018 | Au | |
| 9,979,346 B2* | 5/2018 | Song | H02S 20/32 |
| 9,981,326 B2* | 5/2018 | Gass | B23D 45/067 |
| 10,082,173 B2* | 9/2018 | Jones | F16C 43/02 |
| 10,092,968 B2* | 10/2018 | Fulmer | B23D 45/06 |
| 10,097,134 B2* | 10/2018 | Molina | H02S 20/32 |
| D833,061 S* | 11/2018 | Antony | D26/140 |
| 10,320,326 B2* | 6/2019 | Schimelpfenig | H02S 20/32 |
| 10,441,162 B2* | 10/2019 | Schwaegerle | A61B 3/0075 |
| 2005/0017561 A1* | 1/2005 | Burmeister, III | B60N 2/015 297/354.12 |
| 2007/0274618 A1* | 11/2007 | Sandin | B65G 49/063 384/212 |
| 2009/0085324 A1* | 4/2009 | Blauch | A61G 5/1075 280/304.1 |
| 2009/0265947 A1* | 10/2009 | Sanders | F16C 23/08 33/517 |
| 2009/0268474 A1* | 10/2009 | Ward | F21S 8/02 362/364 |
| 2010/0050843 A1* | 3/2010 | Gass | B23D 45/067 83/477.1 |
| 2011/0048405 A1* | 3/2011 | Koetter | F24S 23/74 126/600 |
| 2011/0240006 A1* | 10/2011 | Linke | F24S 30/425 126/600 |
| 2011/0253195 A1* | 10/2011 | Kim | H02S 20/00 136/246 |
| 2012/0027328 A1* | 2/2012 | Inagaki | B21K 23/00 384/129 |
| 2012/0152308 A1* | 6/2012 | Miller | H01L 31/0543 136/246 |
| 2012/0152311 A1* | 6/2012 | Miller | G01S 3/7861 136/246 |
| 2012/0180845 A1* | 7/2012 | Cole | H02S 20/20 136/246 |
| 2012/0216851 A1* | 8/2012 | Jang | H01L 31/04 136/246 |
| 2013/0039610 A1* | 2/2013 | Schneider | F16C 17/02 384/428 |
| 2013/0160816 A1* | 6/2013 | Barton | H02S 20/32 136/246 |
| 2013/0180568 A1* | 7/2013 | Hartelius | H02S 20/32 136/246 |
| 2013/0286494 A1* | 10/2013 | Behn | F16C 13/04 359/872 |
| 2014/0048124 A1* | 2/2014 | Park | H02S 20/30 136/251 |
| 2014/0090263 A1* | 4/2014 | Barton | G01B 5/25 33/645 |
| 2014/0182654 A1* | 7/2014 | Agullo | F16C 35/02 136/246 |
| 2014/0261626 A1* | 9/2014 | Ripoll Agullo | H02S 20/00 136/246 |
| 2015/0082924 A1* | 3/2015 | Morgan | F16B 7/0493 74/89.14 |
| 2015/0107580 A1* | 4/2015 | Weber | F24S 30/425 126/600 |
| 2015/0234031 A1* | 8/2015 | Corio | G01S 3/7861 250/203.4 |
| 2016/0121412 A1* | 5/2016 | Fulmer | B23D 45/06 83/477.2 |
| 2016/0123383 A1* | 5/2016 | Lamb | F16C 13/04 384/276 |
| 2016/0218663 A1* | 7/2016 | Werner | H02S 20/10 |
| 2016/0243632 A9* | 8/2016 | Fulmer | B23D 45/06 |
| 2018/0013380 A1* | 1/2018 | Childress | H02S 20/32 |
| 2019/0091780 A1* | 3/2019 | Fulmer | B23D 45/06 |
| 2019/0100170 A1* | 4/2019 | Gaucher | B60S 1/4006 |
| 2019/0277482 A1* | 9/2019 | Newton | F21V 15/01 |
| 2019/0339597 A1* | 11/2019 | Wagner | F16M 11/105 |

OTHER PUBLICATIONS

Self-Powered Tracking. NEXTracker, Inc., May 2015 Brochure.
ExotrackHZ. The Utility Tracker: Simple, Smart, Efficient. Brochure.

* cited by examiner

BEARING ASSEMBLY FOR SOLAR TRACKERS

This application claims the benefit of U.S. Provisional Application No. 62/240,661, filed Oct. 13, 2015, entitled BEARING ASSEMBLY FOR SOLAR TRACKERS, the disclosure of which is herein incorporated by reference.

BACKGROUND OF THE INVENTION

1. Field of the Invention

The present invention relates to solar trackers, and more particularly, to solar tracker bearing assemblies that transfer forces between moveable and non-moveable elements of a solar tracker.

2. Description of the Related Art

Solar tracker bearing assemblies are designed to support a moveable mass consisting of elements such as solar modules, torque tubes, levers, linkages, and other hardware. Solar trackers exhibit a variety of bearing assembly designs. A common bearing assembly configuration is described by Shingleton (U.S. Pat. No. 6,058,930) and may be referred to in general as an unbalanced design. In many embodiments of such unbalanced designs, the axes of rotation of the moveable elements are in line with the centerline axes of the torque tube elements. Shingleton's configuration and similar configurations typically position solar modules above torque tube elements. Such positioning locates the center of mass of the moveable elements above the axes of rotation, which is an unstable configuration. Furthermore, when the moveable elements are rotated about the axes of rotation, the center of mass of each row of moveable elements shifts to either side of the axis of rotation of that row. This offset between center of mass and axis of rotation in conjunction with the dead weight of the moveable elements causes a torque load that must be resisted by some other element or elements of the tracker system.

Several solar tracker manufacturers have overcome some disadvantages of the unbalanced design. SunLink Viasol™, NEXTracker SPT™, and Exosun Exotrack HZ™ solar tracker models provide examples of bearing configurations that position the center of mass of the moveable elements at or below their respective axes of rotation. These solutions may be termed balanced designs. However, each of the above example solutions exhibit some disadvantages. The SunLink Viasol™ bearing assembly solves the problem of stability, yet maintains the disadvantage of dead weight torque load. The NEXTracker SPT™ bearing assembly solves the problems of balance, stability, and dead weight torque load, yet introduces configuration constraints and the possibility of solar module shading by protruding above the plane of the solar collecting module surfaces. The Exosun Exotrack HZ™ solves the problems of balance, stability, and dead weight torque load, yet requires a second, parallel line of torque tube elements at each row.

It is desirable to have an alternative bearing assembly configuration that may be used with a single line of torque tube elements, solves the issues of balance, stability, and dead weight torque load, and does not protrude above the plane of the solar collecting module surfaces.

SUMMARY OF THE INVENTION

In general, the present invention is a solar tracker bearing assembly having a rotating element sandwiched between two mounting brackets and held together by fasteners. The rotating element includes an arc-shaped slot such that the rotating element can pivot against the fixed mounting brackets. Bearings may be positioned around the fasteners within the arc-shaped slot. The rotating element can be configured to accept toque tubes of various cross-sections.

According to one embodiment of the invention, the bearing assembly comprises a first mounting bracket, a second mounting bracket, a rotating element comprising an arc-shaped slot, a first fastener, and a second fastener, wherein the first and second fasteners attach the first mounting bracket to the second mounting bracket through the arc-shaped slot in the rotating element, such that the rotating element is positioned between the first and second mounting brackets. The bearing assembly may further comprise a round bearing fitted around each fastener. In another embodiment, a single arc-shaped bearing may be used. The bearing assembly may be configured to accept torque tubes of various cross-sections, such as square (rectangular) or round.

According to another embodiment, a solar tracker system comprises a plurality of solar collecting modules, at least two foundation post, at least one torque tube, a plurality of module rails attaching the plurality of solar collecting modules to the at least one torque tube, and a bearing assembly attached to each foundation post and the torque tube, wherein each bearing assembly comprises a first mounting bracket, a second mounting bracket, a rotating element comprising an arc-shaped slot, a first fastener, and a second fastener, wherein the first and second fasteners attach the first mounting bracket to the second mounting bracket through the arc-shaped slot in the rotating element, such that the rotating element is positioned between the first and second mounting brackets.

According to another embodiment of the present invention, a bearing assembly comprises a first mounting bracket, a second mounting bracket, a rotating element comprising an arc-shaped slot, a first fastener, a second fastener, and two elongated shoulder bearings attached to the first and second fasteners, respectively, between the first and second mounting brackets, such that the two elongated shoulder bearings are positioned in the arc-shaped slot, wherein the first and second fasteners attach the first mounting bracket to the second mounting bracket through the arc-shaped slot in the rotating element, such that the rotating element is positioned between the first and second mounting brackets.

In another embodiment, a bearing assembly comprises a first mounting bracket, a second mounting bracket, a rotating element comprising an arc-shaped slot, a first fastener, a second fastener, and four elongated shoulder bearings forming two shoulder bearing pairs, each shoulder bearing pair attached to the first and second fasteners, respectively, between the first and second mounting brackets, such that at least two elongated shoulder bearing pairs are positioned in the arc-shaped slot, wherein the first and second fasteners attach the first mounting bracket to the second mounting bracket through the arc-shaped slot in the rotating element, such that the rotating element is positioned between the first and second mounting brackets.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1:
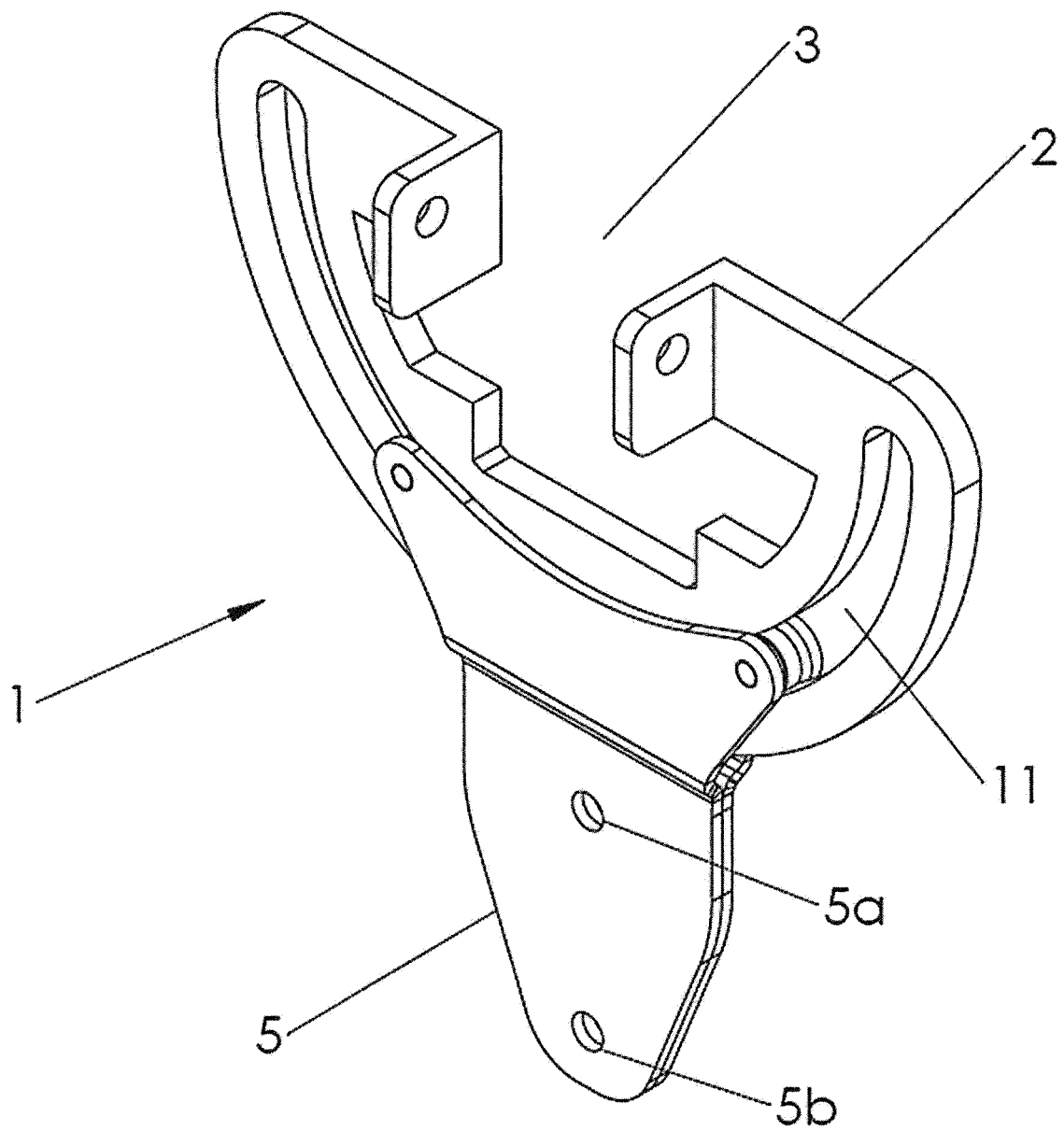
FIG. 1 is a perspective view of a bearing assembly of the present invention.

The following description is provided to enable any person skilled in the art to make and use the invention and sets forth the best modes contemplated by the inventor for carrying out the invention. Various modifications, however, will remain readily apparent to those skilled in the art. Any and all such modifications, equivalents and alternatives are intended to fall within the spirit and scope of the present invention.

Referring to FIGS. 1-7 there is shown a bearing assembly 1, according to an embodiment of the present invention, having a rotating element 2 sandwiched between two mounting brackets 5, 6 and held together by pins 7, 8. Assembled to pins 7, 8 and within an arc-shaped slot 11, two round bearings 9, 10 are positioned between the two mounting brackets 7, 8. The round bearings 9, 10 may be metal bearings, or formed of plastic.

Figure 6:
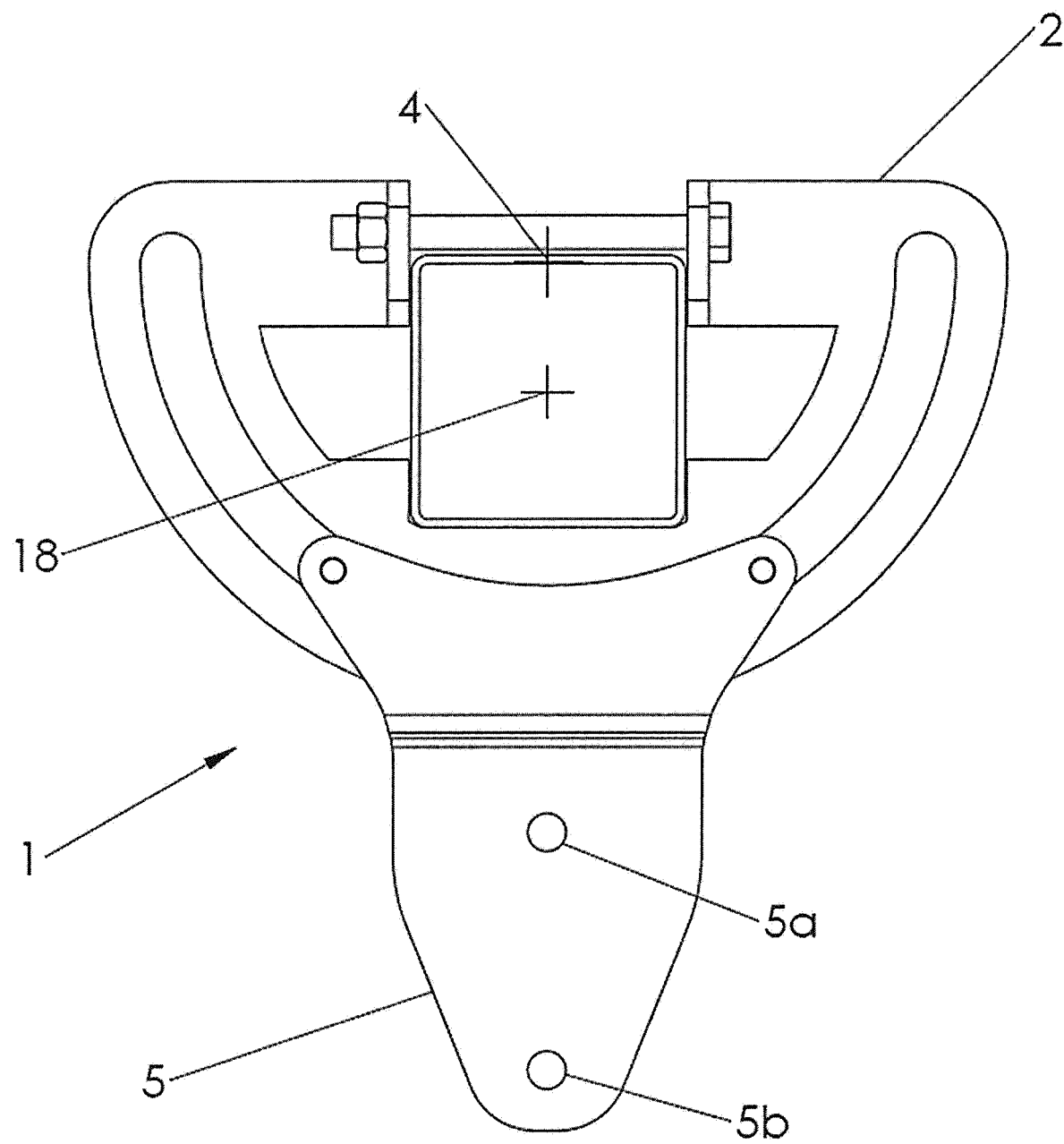
FIG. 6 is a frontal view of a bearing assembly of FIG. 1 assembled with an example of a torque tube element.
Figure 7:
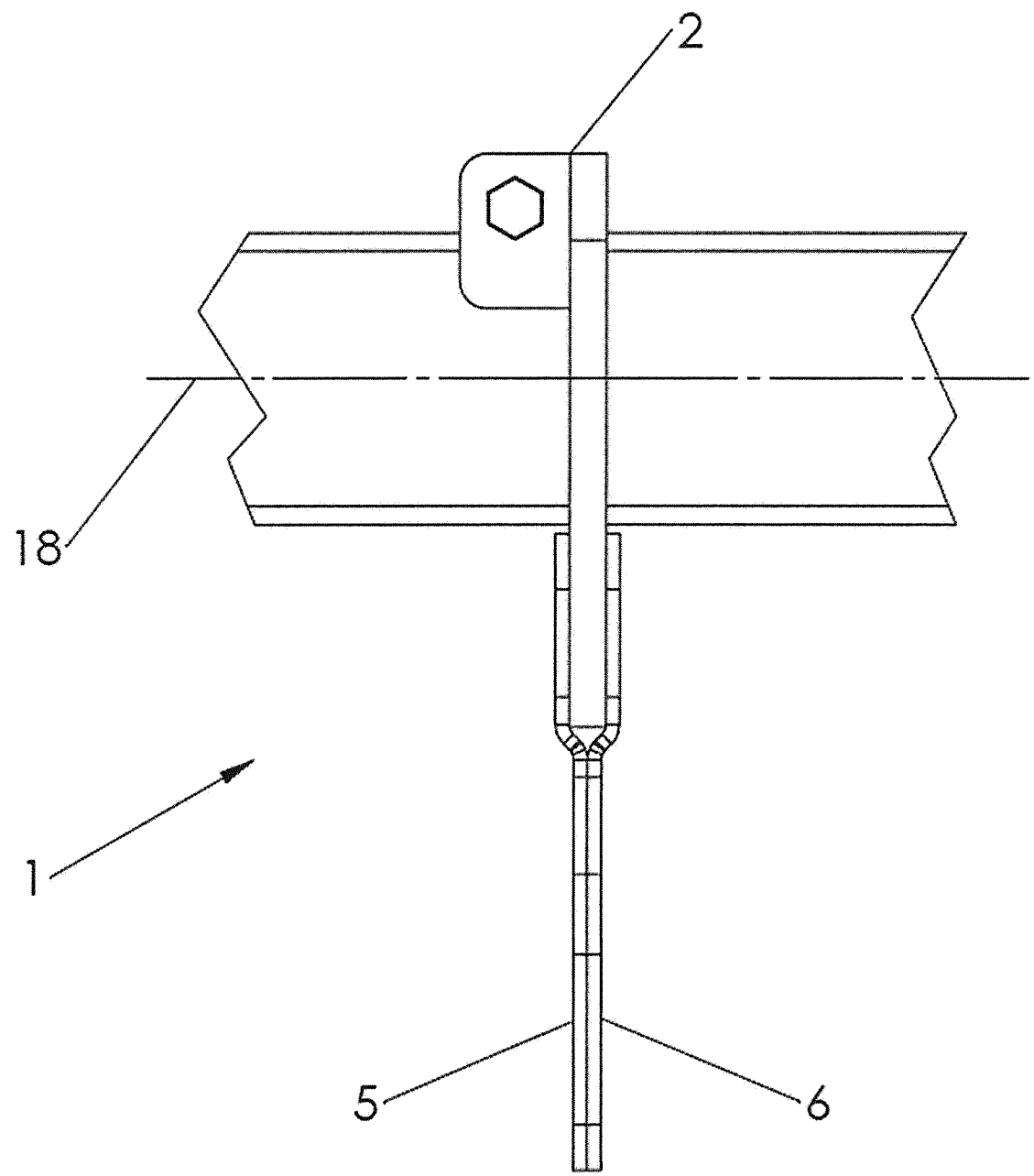
FIG. 7 is a side view of a bearing assembly of FIG. 1 assembled with an example of a torque tube element.

As shown in FIG. 1, a rotating element 2 contains an opening 3 that enables assembly of a tubular profile to rotating element 2. An example of a square (rectangular) tubular profile assembled to rotating element 2 is shown in FIGS. 6-7.

Figure 2:
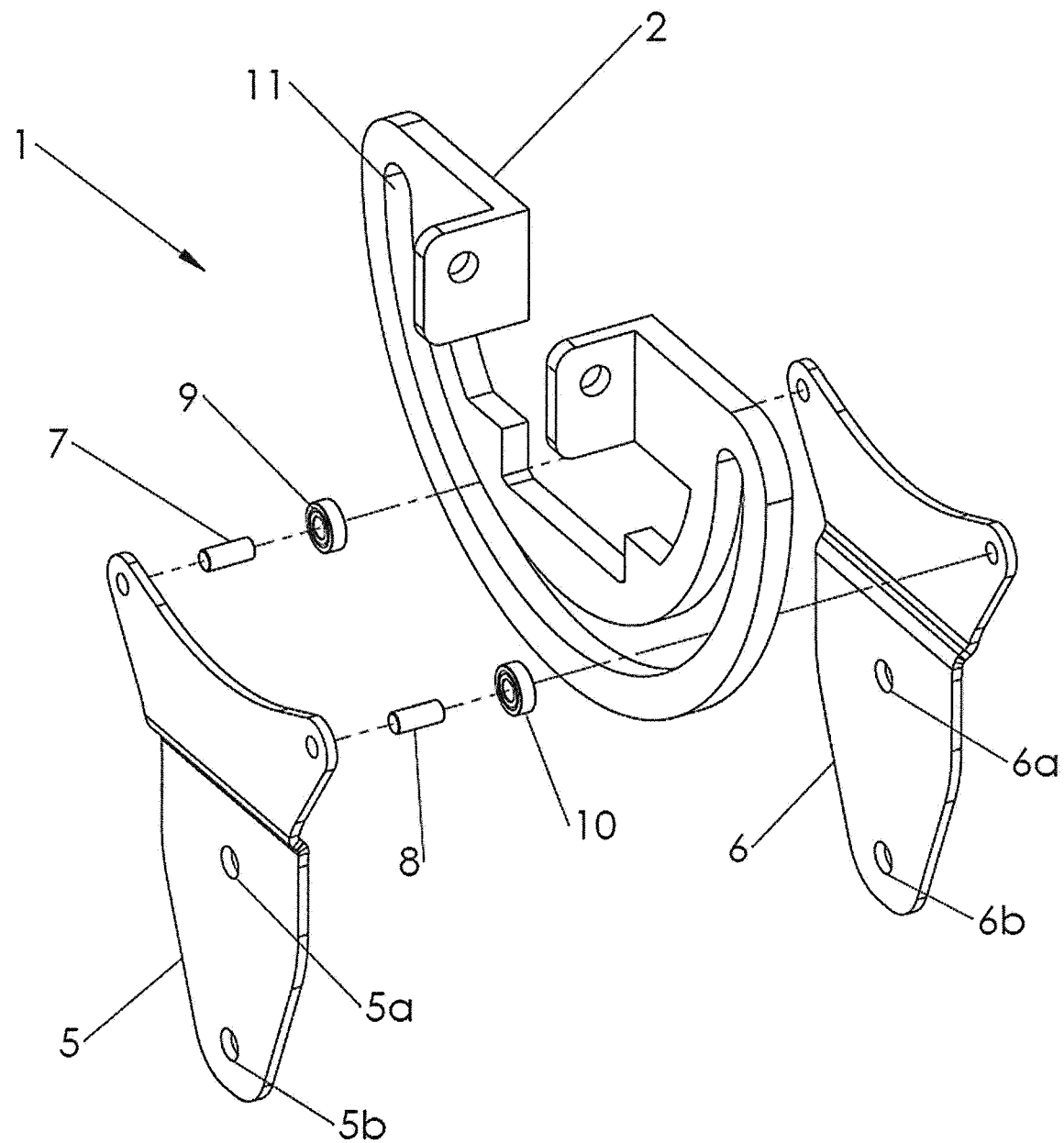
FIG. 2 is an exploded view of a bearing assembly of FIG. 1.

As shown in FIG. 2, the mounting brackets 5, 6 may have holes 5a, 5b and 6a, 6b or other features to enable assembly to a non-moveable element.

Figure 3:
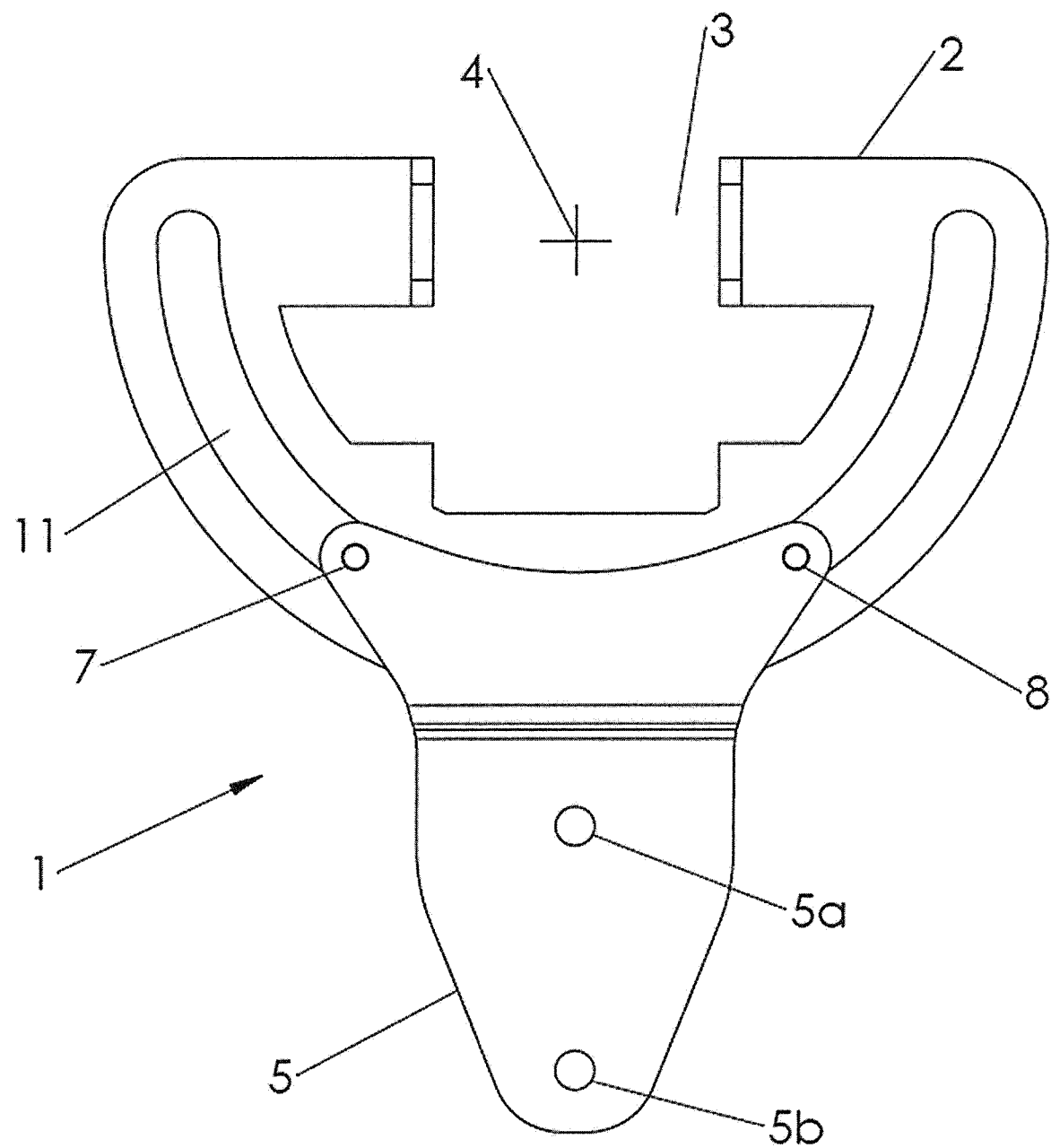
FIG. 3 is a frontal view of a bearing assembly of FIG. 1.
Figure 4:
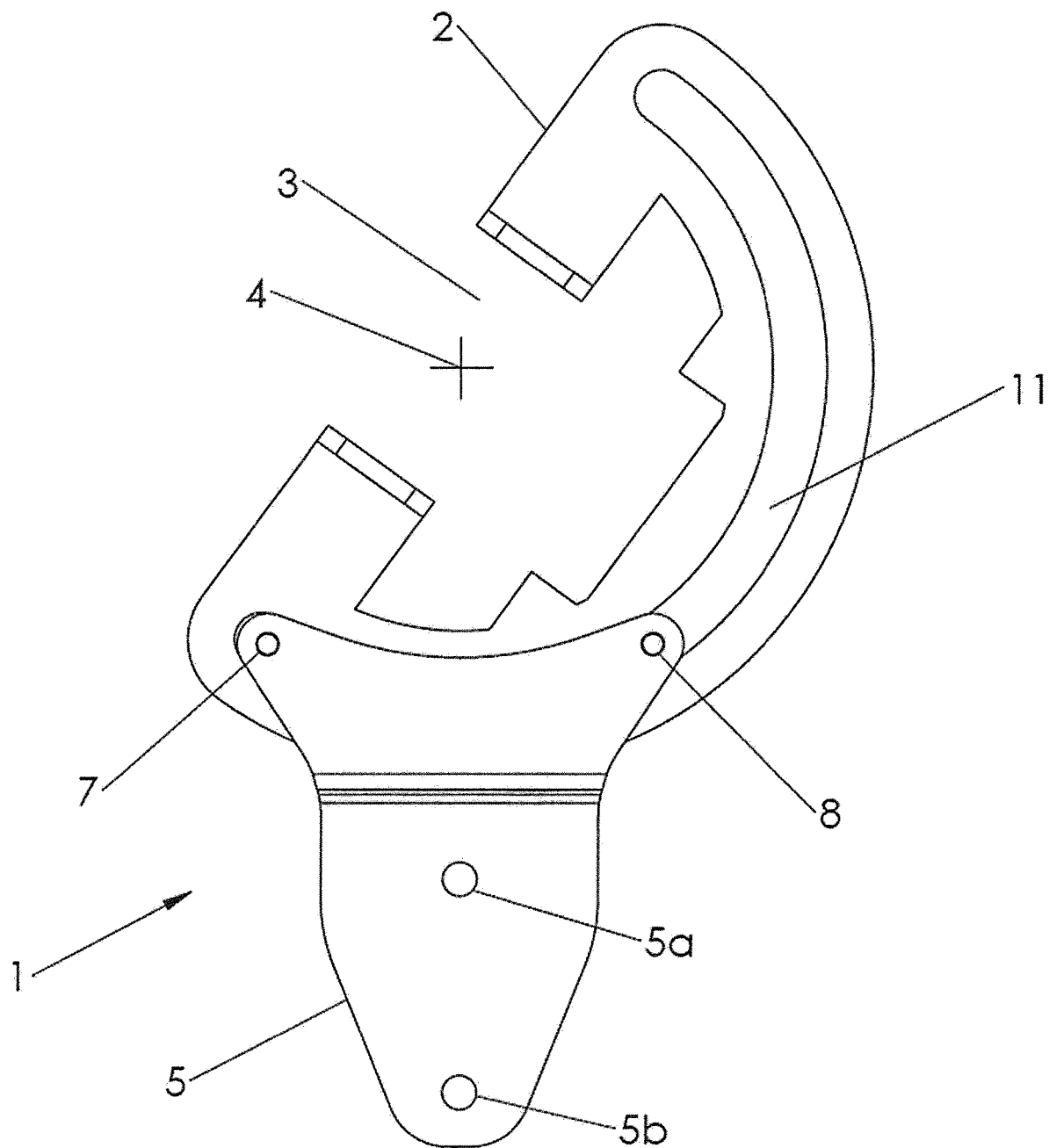
FIG. 4 is a frontal view of a bearing assembly of FIG. 1 in a rotated position.
Figure 5:
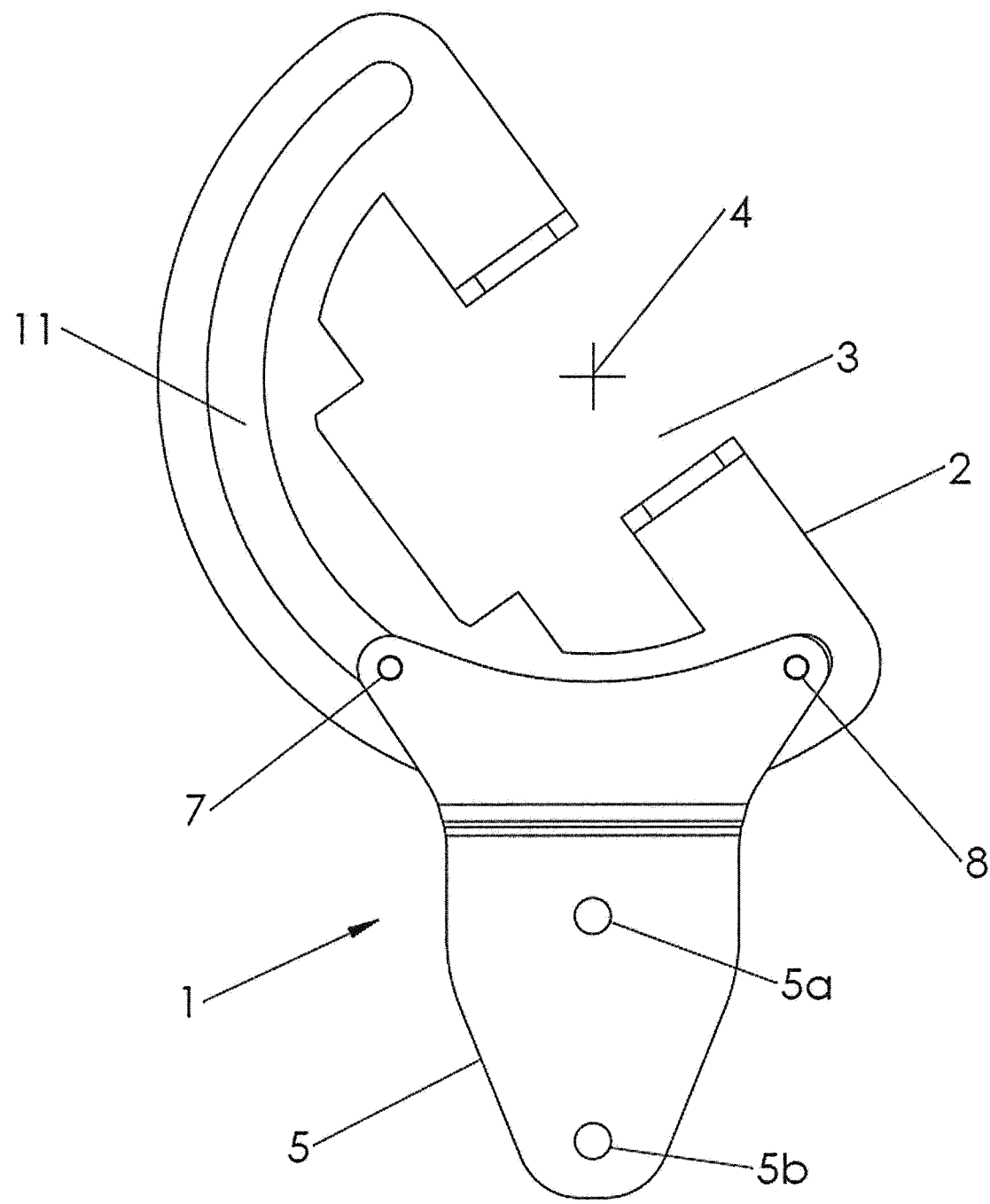
FIG. 5 is a frontal view of a bearing assembly of FIG. 1 in a rotated position.

When the mounting brackets 5, 6 are held fixed, such as being attached to a non-moveable element (i.e a mounting post, not shown), a rotating element 2 is able to rotate about a pivot point 4 as shown in FIGS. 3-5. The rotating element 2 is able to rotate in either direction about a pivot point 4 from 0° as shown in FIG. 3 to an amount such as approximately 50° to 60° or more or less as shown in FIGS. 4-5. The limits of rotation of the rotating element 2 may be adjusted by varying the length of the arc-shaped slot 11 and/or the radius of arc-shaped slot 11 and/or the distance between pins 7, 8.

FIGS. 3-5 illustrate that the pivot point 4 may occupy a point in space unobstructed by the bearing assembly 1.

As shown in FIGS. 6-7 the centerline axis 18 of a tubular element assembled to rotating element 2 may be located below the pivot point 4.

The construction details of the invention shown in FIGS. 1-7 are that a bearing assembly 1 may be made of steel, iron, or of any other sufficiently strong and rigid material. Further, various components of the bearing assembly 1 may be made of different materials.

The bearings 9, 10 shown in FIG. 2 may be plain, rolling-element, or of another type. Further, the bearings 9, 10 shown in FIG. 2 may be omitted, resulting in a configuration of bearing assembly 1 wherein the rotating element 2 bears directly on the pins 7, 8. The pins 7, 8 shown in FIG. 2 may be substituted for bolts, shoulder bolts, or other fastener types.

Figure 8:
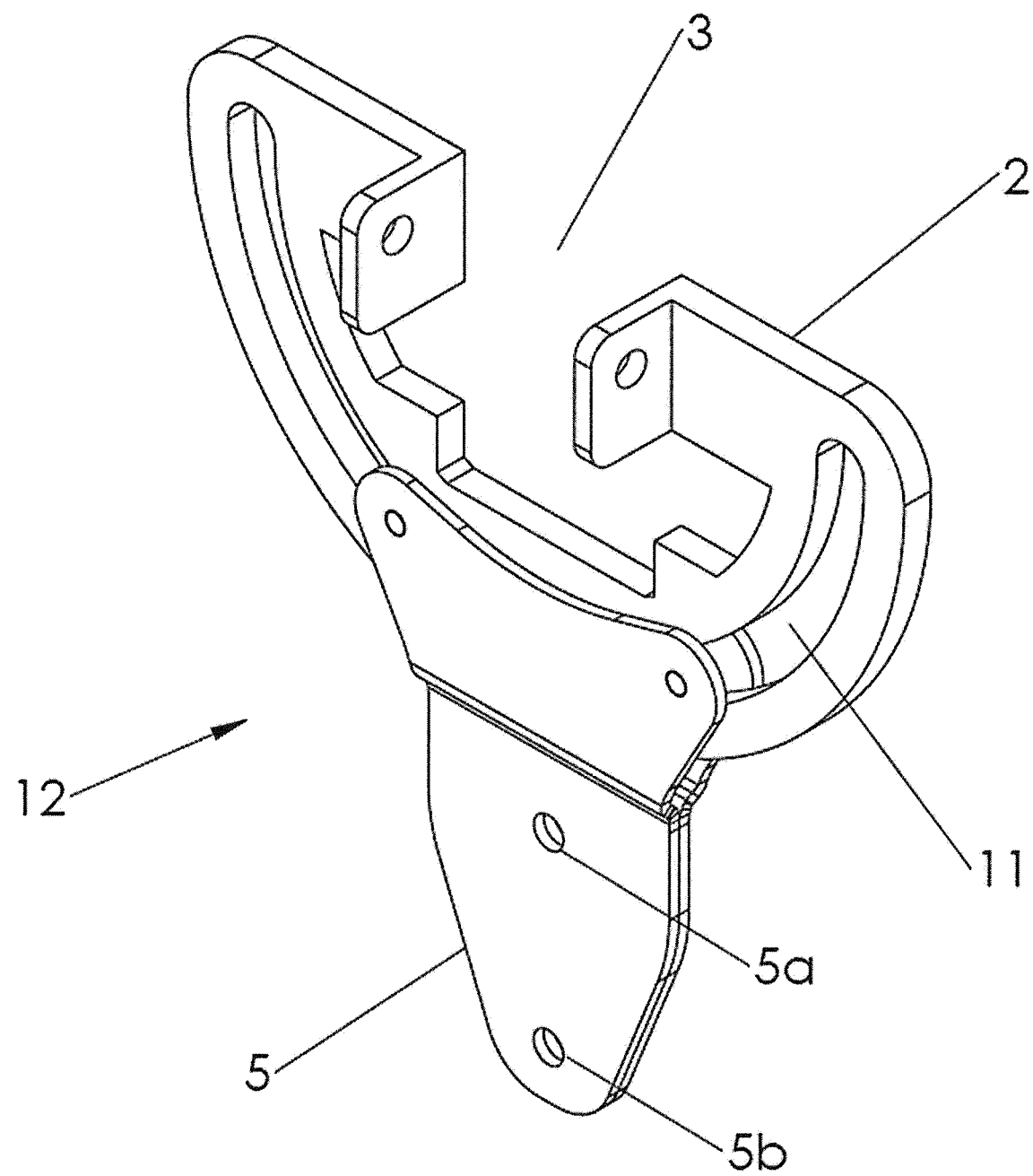
FIG. 8 is a perspective view of a bearing assembly of the present invention.
Figure 9:
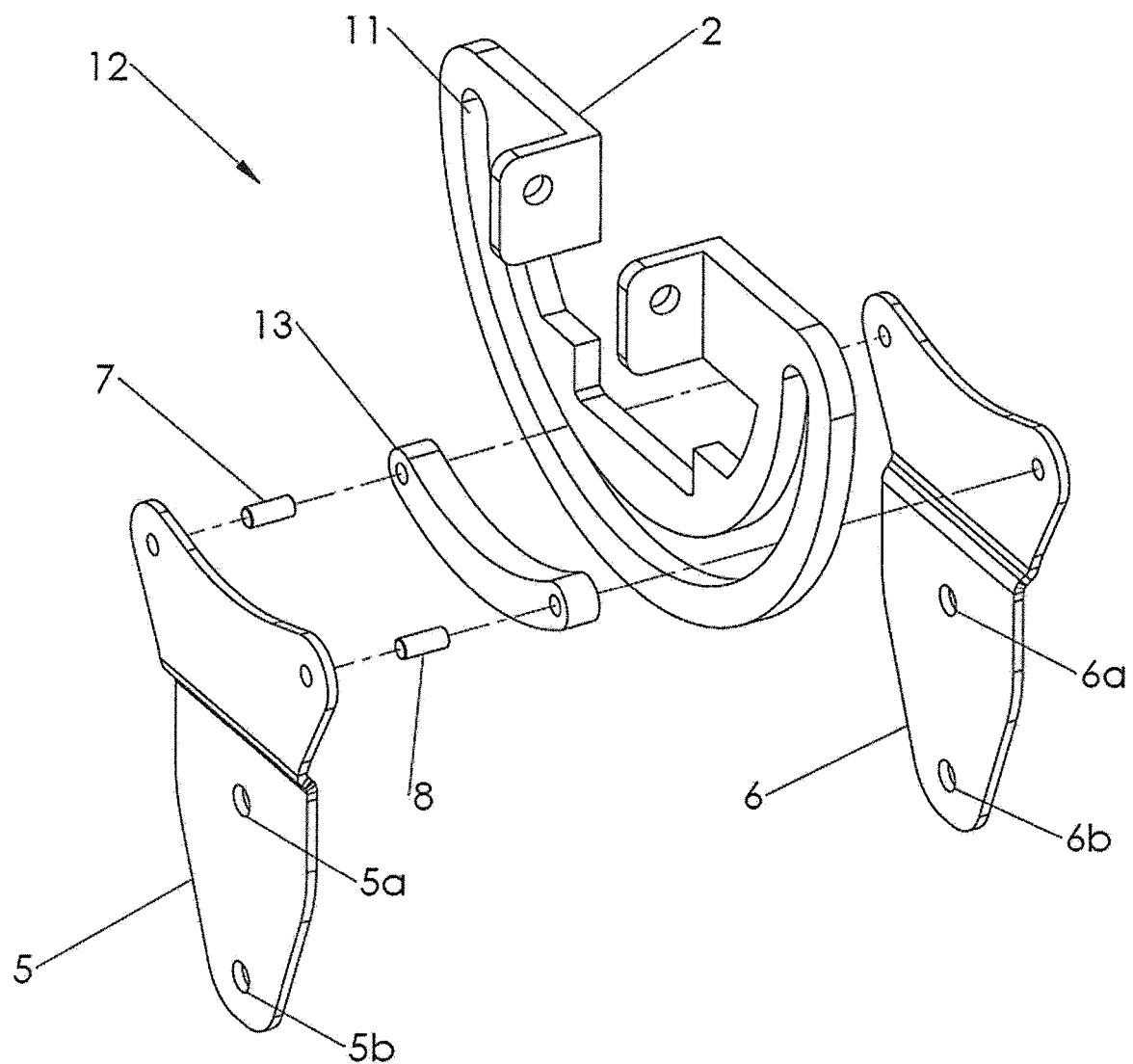
FIG. 9 is an exploded view of a bearing assembly of FIG. 8.

Referring now to FIGS. 8-9, there is shown a bearing assembly 12 that incorporates an alternate arc-shaped bearing 13. The arc-shaped bearing 13 has a unitary construction and is configured with a curvature to interface with the arc-shaped slot 11 in the rotating element 2. Such a unitary curved bearing 13 may be preferable to round bearings in certain applications, especially given the potentially large forces involved in supporting and rotating a large solar tracker structure.

Figure 10:
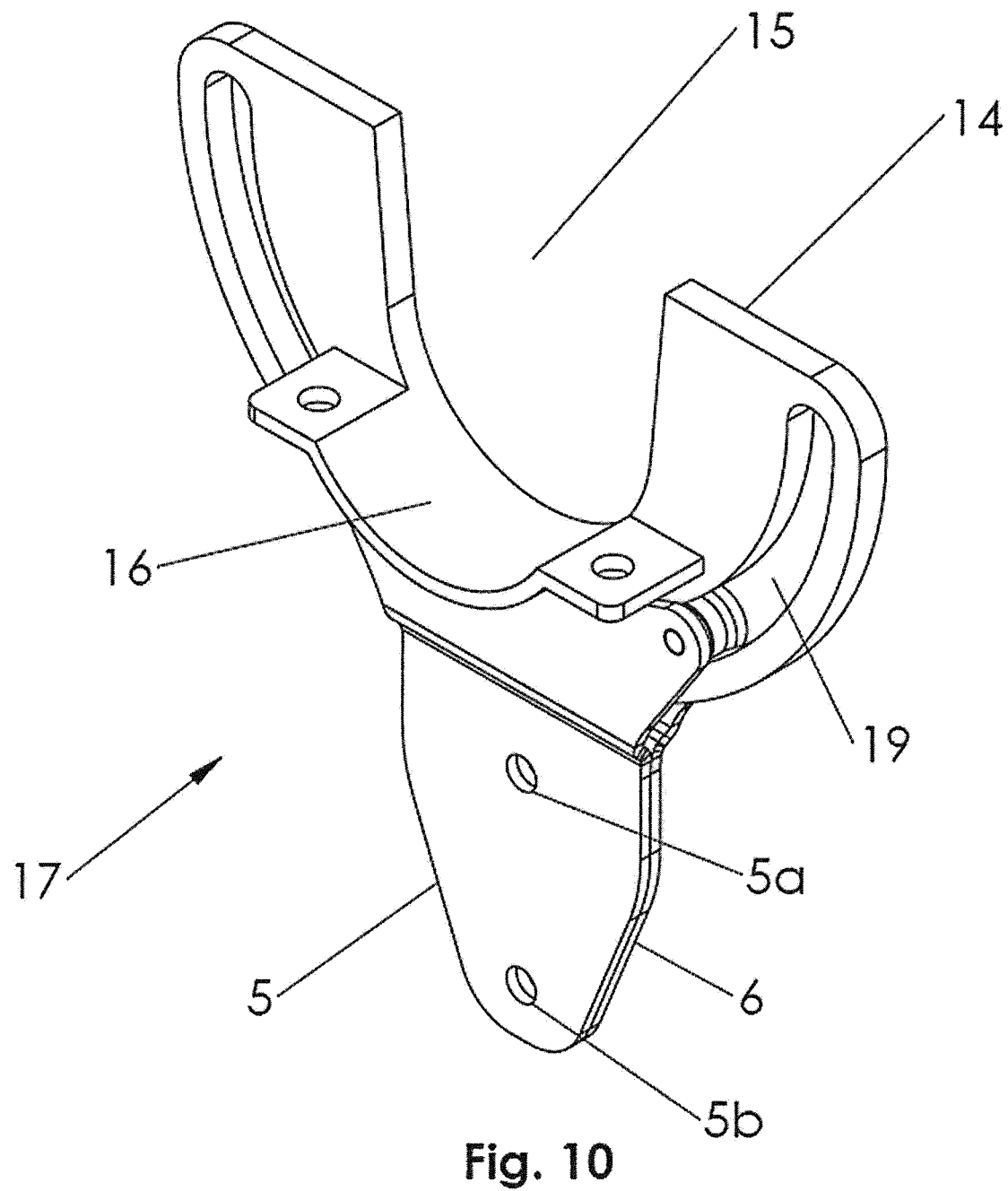
FIG. 10 is a perspective view of a bearing assembly of the present invention.

Referring now to FIG. 10, there is shown a bearing assembly 17 that incorporates an alternate rotating element 14. Similar to the rotating element 2, the alternate rotating element 14 has an arc-shaped slot 19. In contrast to the rotating element 2, the alternate rotating element 14 has an opening 15 and a bracket 16 that enable assembly of a tubular element with a round profile.

Figure 11:
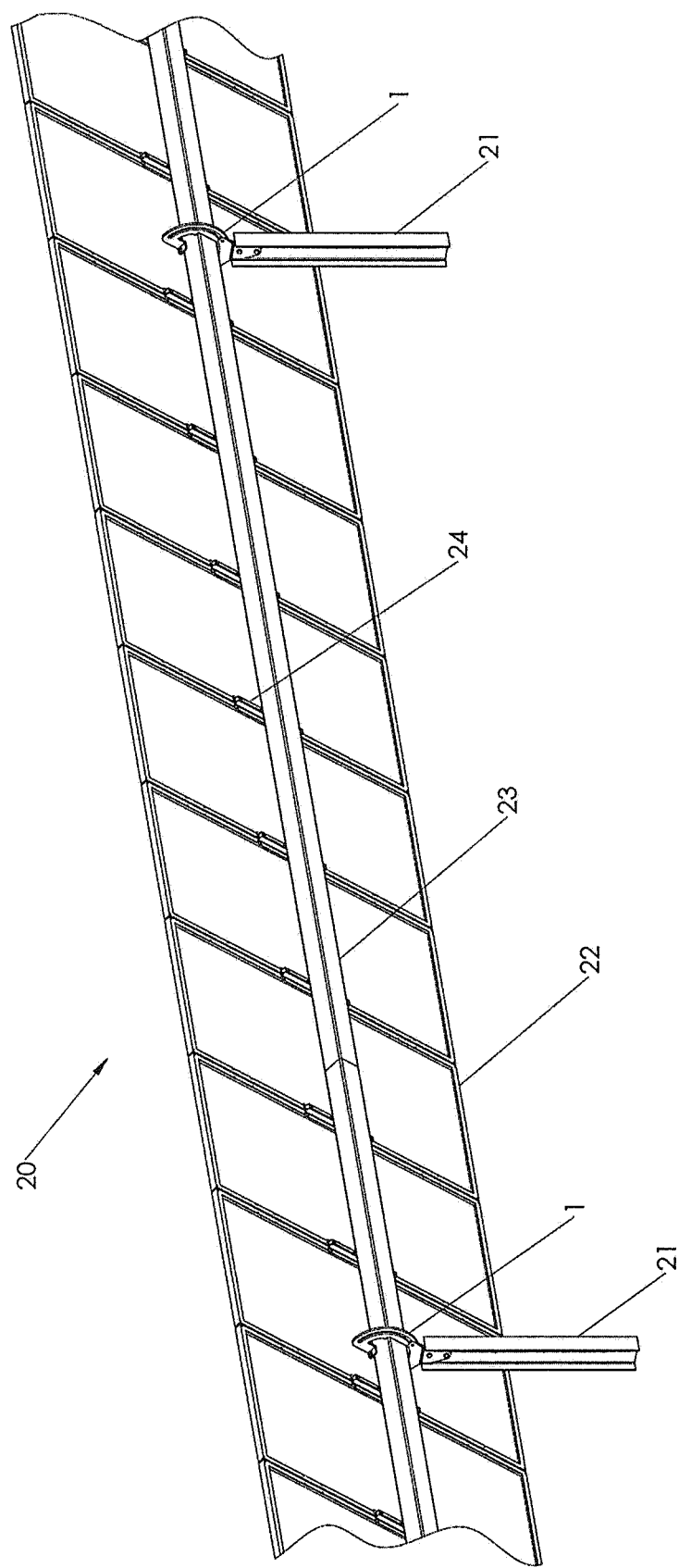
FIG. 11 is a perspective view of a solar panel system incorporating the present invention.

Referring now to FIG. 11, there is shown an assembly 20 that depicts bearing assemblies of FIG. 1 in assembly with other typical elements of an example solar tracker such as foundation posts 21, solar collecting modules 22, torque tube 23, and module rails 24. FIG. 11 also illustrates that a bearing assemblies 1 do not protrude above the plane of the solar collecting modules 22 surface and may be positioned directly beneath a solar collecting modules 22.

Figure 12:
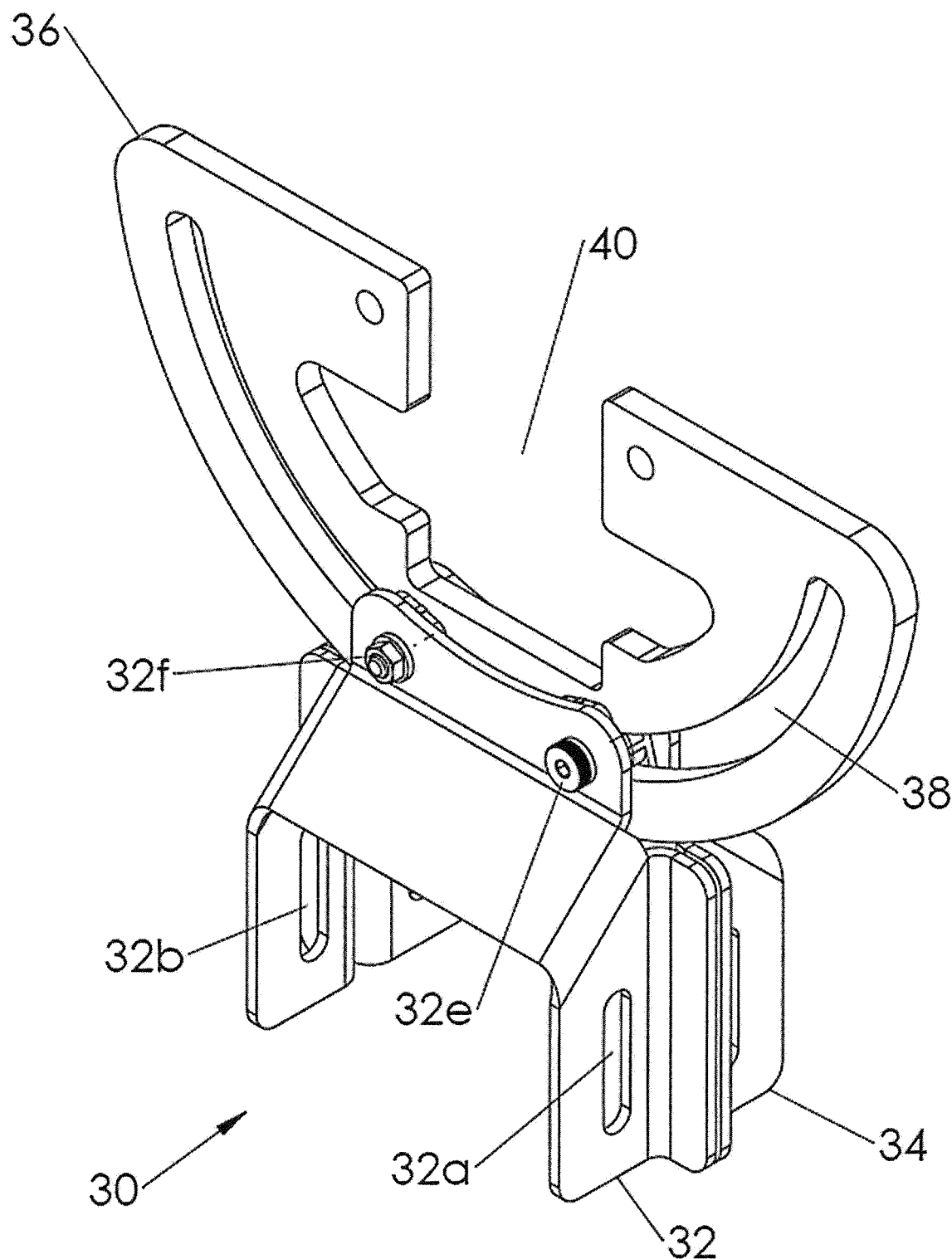
FIG. 12 is a perspective view of an alternative embodiment of a bearing assembly of the present invention.

An alternative embodiment of the present in invention is illustrated in FIGS. 12 to 15. Specifically, FIG. 12 is a perspective view of the alternative embodiment of a bearing assembly. In this embodiment, as described below, four unique bearings are used in the arc-shaped slot, where each bearing includes an elongated raised shoulder.

Figure 13:
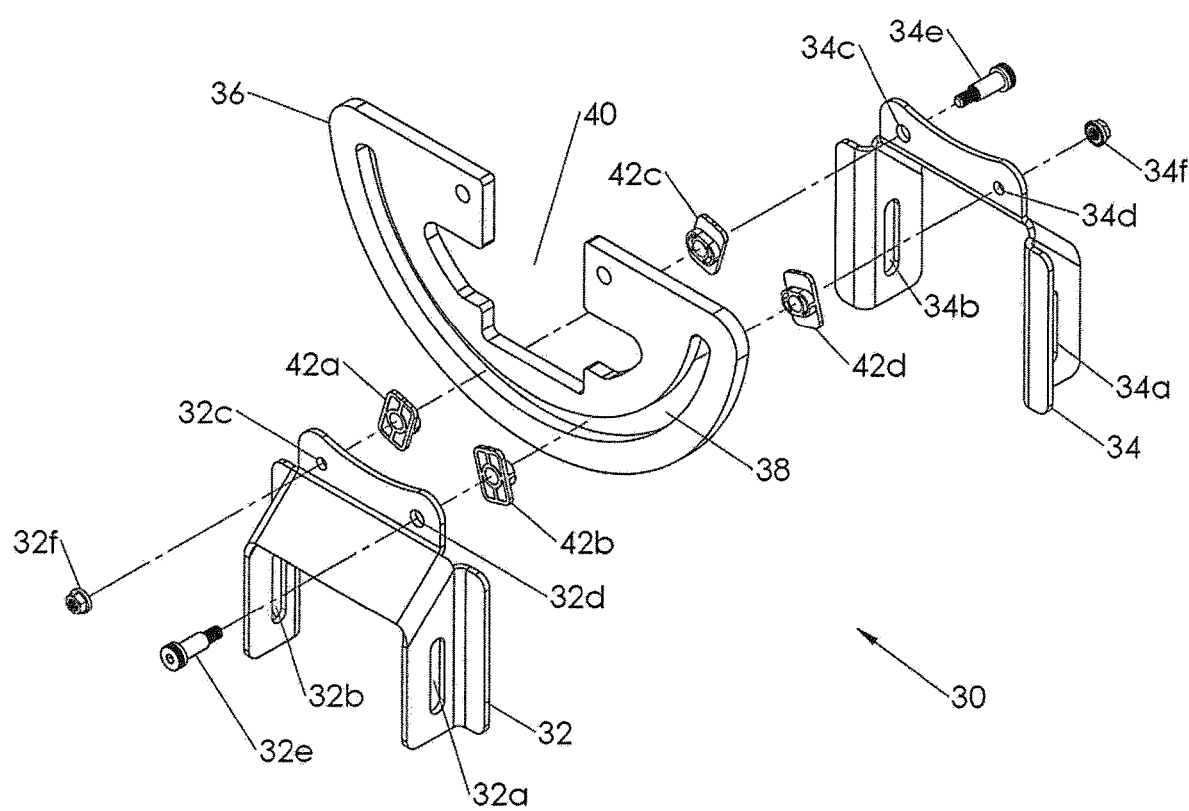
FIG. 13 is an exploded view of the bearing assembly of FIG. 12.

FIG. 13 is an exploded view of the alternative embodiment of a bearing assembly illustrated in FIG. 12. Two mounting brackets 32, 24 include mounting slots 32a, 32b and 34a, 34b, respectively. The mounting slots 32a, 32b and 34a, 34b allow the mounting brackets 32, 32 to affix to a mounting post (not shown). Each mounting bracket 32, 34 further includes holes 32c, 32d and 34c, 34d, respectively. Mounting screws 32e, 34e attach the mounting brackets to the rotating element 36, and are secured by mounting flange nuts 32f, 34f. The mounting screws 32e, 34e have generally smooth shafts as shown. The mounting screws 32e, 34e can also be bolts or pins, as described above. As shown in the figure, the mounting screws 32e, 34e are positioned in opposite directions, but they could be placed in the same orientation as well.

Similar to the previous embodiments, the rotating element 36, includes an arc-shaped slot 38, and an opening 40 to mount a torque tube (not shown). However, in this embodiment, four unique bearing elements 42a-42d are positioned in the arc-shaped slot 38, and sandwiched between the mounting brackets 32, 34. Each bearing 42a-42b includes an elongated shoulder positioned in the arc-shaped slot 38. The mounting screws 32e, 34e and mounting flange nuts 32f, 34f secure the assembly together and the mounting screws 32e, 34e pass through the centers of respective bearing pairs.

In further detail, two bearings 42a, 42c are positioned facing each other in the arc-shaped slot 38. Similarly, the other two bearings 42b, 42d are positioned in the arc-shaped slot 38 facing each other. Each bearing pair is held together by a mounting screw passing through the center of each bearing.

Figure 14:
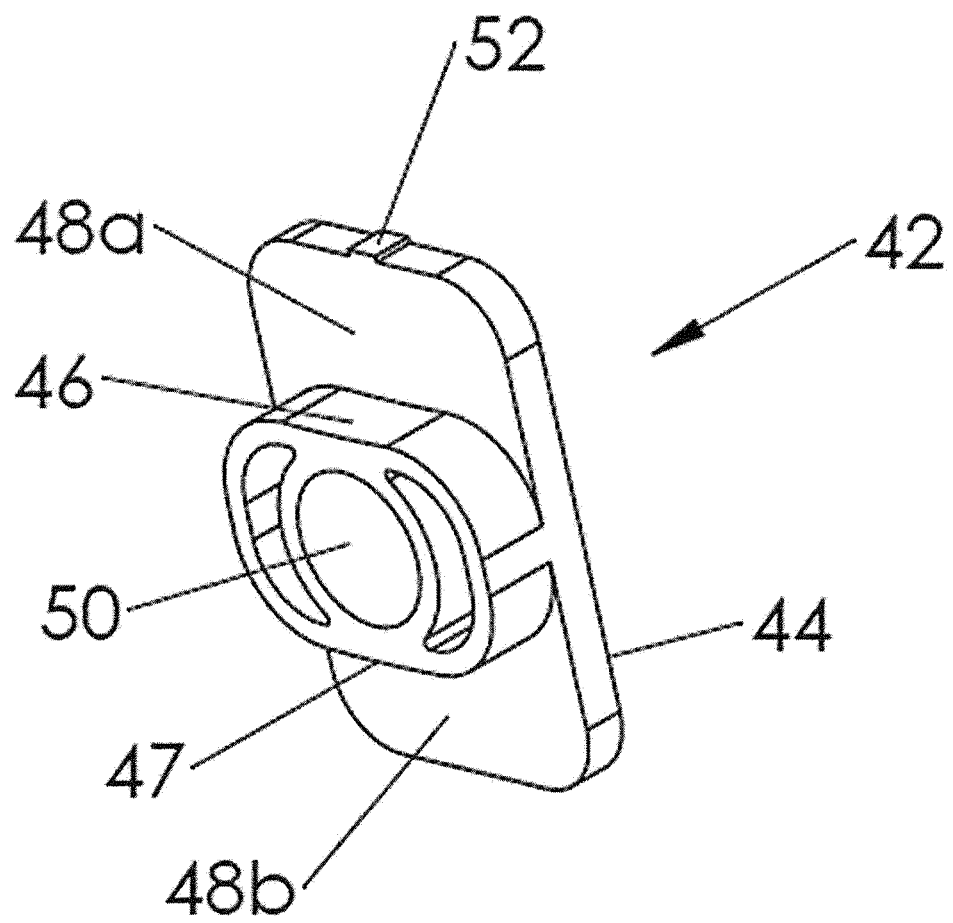
FIG. 14 is a detailed view of a bearing according to the embodiment of FIGS. 12 and 13.
Figure 15:
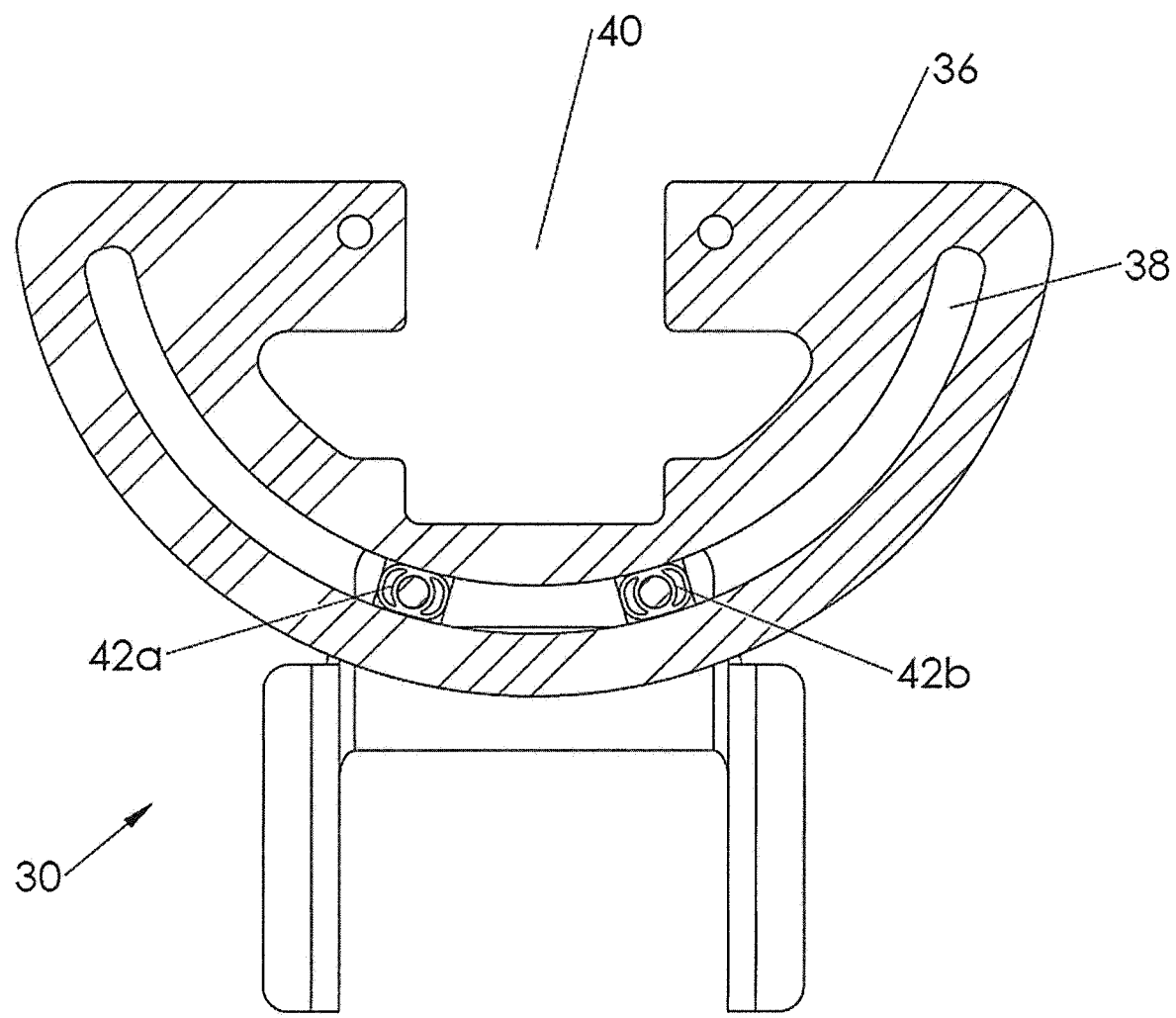
FIG. 15 illustrates the bearings of FIG. 14 in position in the bearing assembly of FIGS. 12 and 13.

As shown in FIG. 14, each bearing 42 comprises a generally flat back surface 44 and an elongated shoulder having a center hole 50. The bearing 42 includes an upper 48a and lower 48b flange which resist the side loads. In addition, the bearing includes an elongated shoulder having an upper concave surface 46 which resists the dead weight of the system and any downward forces. The bearing's lower surface 47 is convex and resists any upward forces. The shape of the bearing is such that the upper surface 46 and lower surface 47 have a slight arc to align with the arc-shaped slot 38 in the bearing assembly 30. This is illustrated in FIG. 15, where cross-sections of the bearings 42a and 42b are shown aligned in the arc-shaped slot 38. A raised orientation bump 52 is used to properly orient each elongated shoulder bearing 42 with respect to the arc-shaped slot 38.

While an exemplary bearing for use in the present embodiment is illustrated in FIG. 14, and described herein, the exact configuration may be modified from the exact configuration described without departing from the scope of the present invention. For example, each bearing pair could instead be configured as a unitary bearing having an elongated shoulder, but only one back surface, and configured to have sufficient depth for the shoulder to generally fill the arc-shaped opening. As another example, each bearing pair could be configured as a unitary bearing, with two back surfaces, such that on at least one end of the arc-shaped slot a larger opening is formed to allow a unitary bearing to be inserted into the slot and slid down into position. This would effectively "lock" each bearing in the arc-shaped slot by the respective flanges on each side of the unitary bearing. Other similar modifications will be apparent to those of skill in the art.

FIG. 15 shows a cross-sectional view of the bearing assembly of FIGS. 12 and 13. Specifically, the elongated shoulder bearings 42a, 42b are shown positioned in the arc-shaped slot 38 such that the curved elongated shoulders of each bearing are aligned in the arc-shaped slot 38.

The advantages of the present invention include, without limitation, that a solar tracker which incorporates the invention may be designed to be balanced and/or stable. The invention enables a solar tracker to be designed such that the drive system does not need to resist additional forces due to dead weight torque. In a typical configuration, the invention does not protrude above the plane of the solar modules, allowing solar modules to be mounted directly over the invention. Tubular elements may be easily assembled to the invention.

Those skilled in the art will appreciate that various adaptations and modifications of the just described preferred embodiments can be configured without departing from the scope and spirit of the invention. Therefore, it is to be understood that, within the scope of the appended claims, the invention may be practiced other than as specifically described herein.

What is claimed is:

1. A solar tracker system comprising:
   (a) a plurality of solar collecting modules;
   (b) at least two foundation posts;
   (c) at least one torque tube;
   (d) a plurality of module rails attaching the plurality of solar collecting modules to the at least one torque tube; and
   (a) a rotating element comprising a first side, a second side, and an arc-shaped slot extending therethrough;
   (b) a first mounting bracket positioned on the first side of the rotating element;
   (c) a second mounting bracket positioned on the second side of the rotating element;
   (d) a first fastener extending through the arc-shaped slot and connecting the first mounting bracket to the second mounting bracket;
   (e) a second fastener extending through the arc-shaped slot and connecting the first mounting bracket to the second mounting bracket; and
   (f) a non-rotational, stationary arc-shaped bearing that is (i) attached to the first fastener, (ii) attached to the second fastener, and (iii) positioned in the arc-shaped slot.

2. The solar tracker system of claim 1, wherein the rotating element further comprises an opening for a tubular structure.

3. The solar tracker system of claim 2, wherein the opening is configured to receive a square tubular shape structure.

4. The solar tracker system of claim 2, wherein the opening is configured to receive a round tubular shape structure.

5. The solar tracker system of claim 1, wherein the first and second fasteners comprise pins.

6. The solar tracker system of claim 1, wherein the first and second fasteners comprise bolts.

7. The solar tracker system of claim 1, wherein the first and second fasteners comprise shoulder bolts.

8. The solar tracker system of claim 1, wherein the first and second brackets each comprise first and second mounting holes.

9. A solar tracker system comprising:
   (a) a plurality of solar collecting modules;
   (b) at least two foundation posts;
   (c) at least one torque tube;
   (d) a plurality of module rails attaching the plurality of solar collecting modules to the at least one torque tube;
   (e) a rotating element comprising a first side, a second side, and an arc-shaped slot extending therethrough;
   (f) a first mounting bracket on the first side of the rotating element;
   (e) a second mounting bracket on the second side of the rotating element;
   (g) a first fastener extending through the arc-shaped slot and connecting the first mounting bracket to the second mounting bracket;
   (h) a second fastener extending through the arc-shaped slot and connecting the first mounting bracket to the second mounting bracket;
   (i) a non-rotational, stationary first shoulder bearing that is: (i) attached to the first fastener, and (ii) positioned in the arc-shaped slot; and
   (j) a non-rotational, stationary second shoulder bearing that is: (i) attached to the second fastener, and (ii) positioned in the arc-shaped slot.

10. The solar tracker system of claim 9, wherein the rotating element further comprises an opening for a tubular structure.

11. The solar tracker system of claim 9, wherein the opening is configured to receive a square tubular shape structure.

12. The solar tracker system of claim 9, wherein the opening is configured to receive a round tubular shape structure.

13. The solar tracker system of claim 9, wherein the first and second fasteners comprise pins.

14. The solar tracker system of claim 9, wherein the first and second fasteners comprise bolts.

15. The solar tracker system of claim 9, wherein the first and second fasteners comprise shoulder bolts.

16. The solar tracker system of claim 9, wherein the first and second brackets each comprise first and second mounting holes.

17. The solar tracker system of claim 9, wherein the first fastener and second fastener each comprise a mounting screw and a mounting flange nut, respectively.

18. The solar tracker system of claim 9, wherein the non-rotational, stationary first shoulder bearing has an elongated shoulder having an upper concave surface, and the non-rotational, stationary second shoulder bearing has an elongated shoulder having an upper concave surface.

19. The solar tracker system of claim 9, wherein the non-rotational, stationary first shoulder bearing has a raised orientation bump configured to properly orient the first shoulder bearing with respect to the arc-shaped slot, and the non-rotational, stationary second shoulder bearing has a raised orientation bump configured to properly orient the second shoulder bearing with respect to the arc-shaped slot.

* * * * *